No. 804,654. PATENTED NOV. 14, 1905.
J. G. GIBSON.
FLY TRAP.
APPLICATION FILED MAR. 11, 1905.
2 SHEETS—SHEET 1.
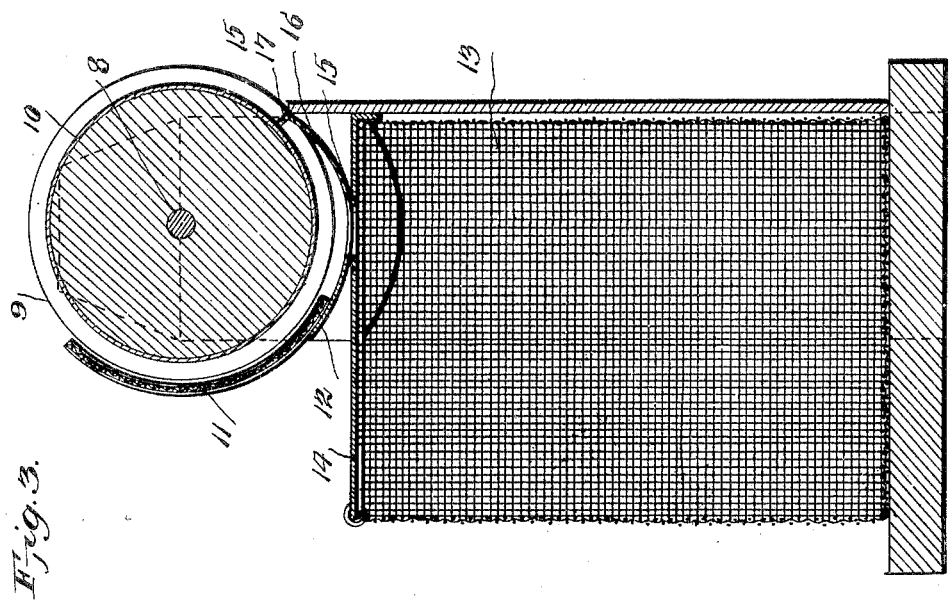
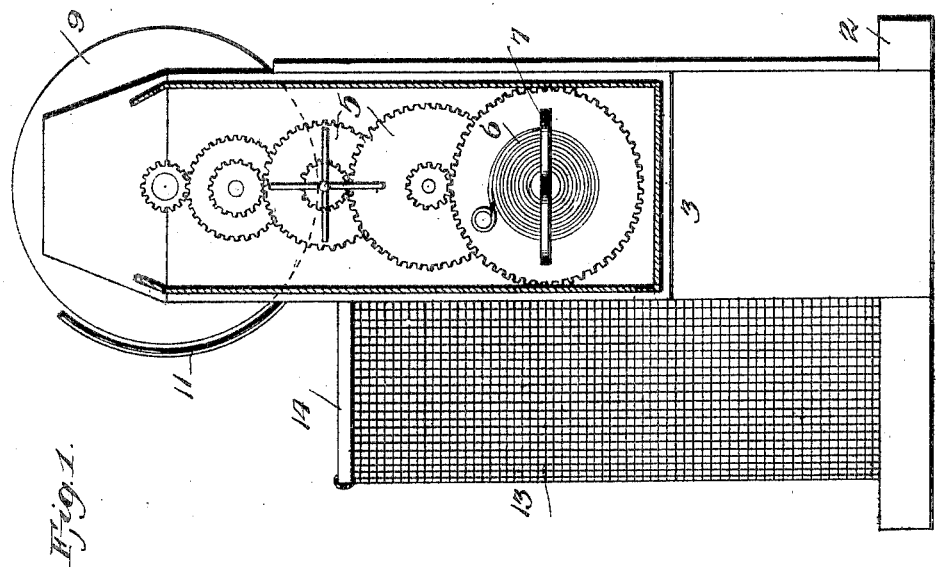
Witnesses
Frank N Hough
Katharine Allen.
Inventor
J. G. Gibson.
By Victor J. Evans
Attorney

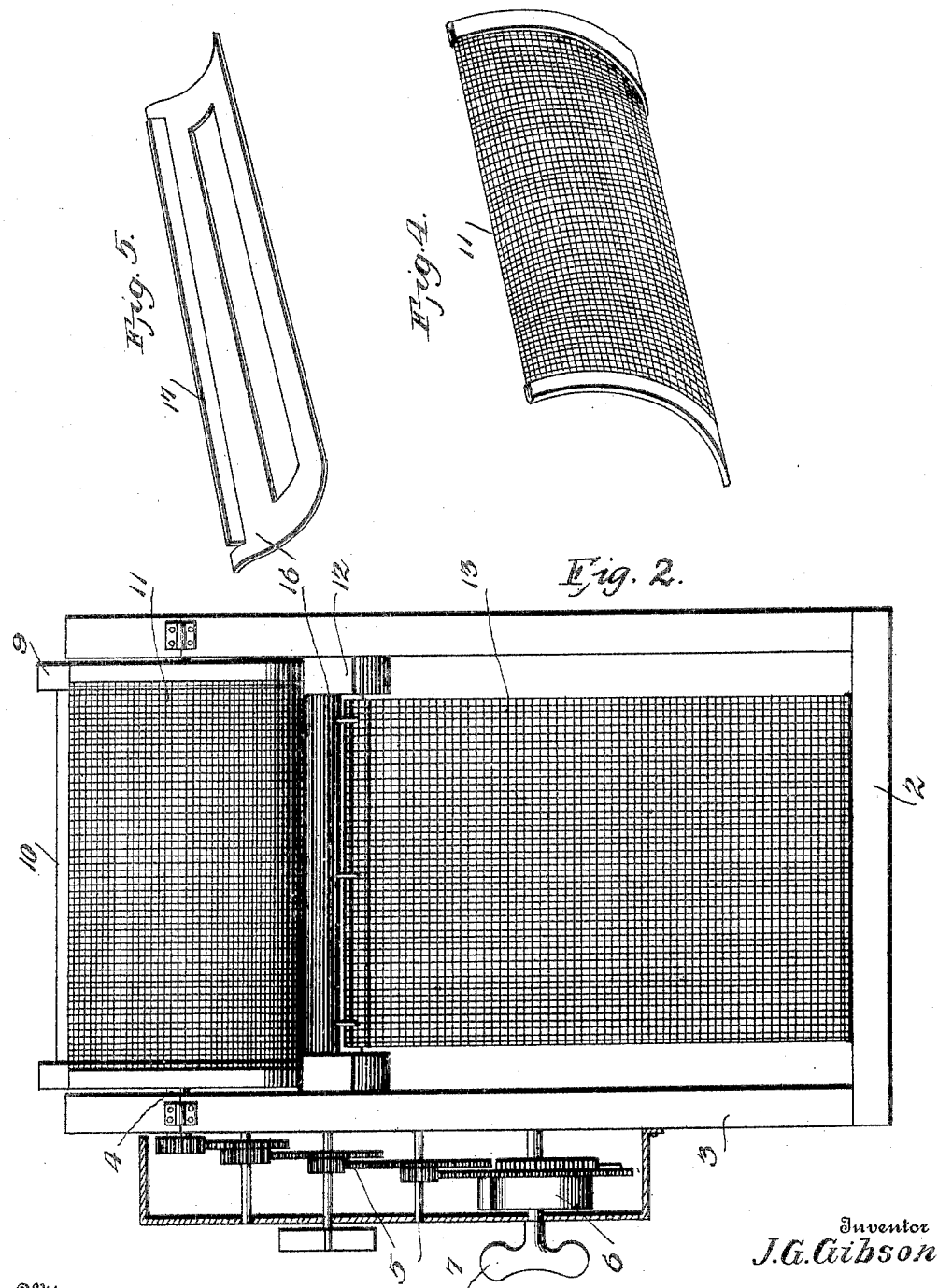

UNITED STATES PATENT OFFICE.

JAMES G. GIBSON, OF IRONTON, COLORADO.

FLY-TRAP.

No. 804,654.      Specification of Letters Patent.      Patented Nov. 14, 1905.

Application filed March 11, 1905. Serial No. 249,615.

*To all whom it may concern:*

Be it known that I, JAMES G. GIBSON, a citizen of the United States, residing at Ironton, in the county of Ouray and State of Colorado, have invented new and useful Improvements in Fly-Traps, of which the following is a specification.

The invention relates to an improvement in fly-traps, and contemplates a certain novel construction and arrangement of parts which will be effective for the purpose designed.

The preferred arrangement of parts is illustrated in the accompanying drawings in two sheets, in which—

Figure 1 is a side elevation of my improved fly-trap, the casing for the power mechanism being in section. Fig. 2 is a front elevation of the same. Fig. 3 is a vertical longitudinal section of the same. Fig. 4 is a perspective view of the guard. Fig. 5 is a perspective view of the scraper.

Referring to the drawings, my improved fly-trap comprises a framework 1, preferably including a base 2 and uprights 3. In the uprights, near the upper end thereof, is revolubly supported a shaft 4, continuously driven by a train of reducing-gearing 5, connected with a motor 6, such as a spring-motor suitably wound through a key 7. The shaft 4 is preferably journaled by forming registering semicircular recesses 8 in separated sections of the uprights 3 and hinging said sections together, whereby the shaft is adapted for convenient insertion and removal. The shaft fixedly supports a drum 9 of a length to fit between the uprights 3, which drum is preferably of the ordinary wire-netting. The drum is designed to be circumferentially covered by a strip of paper or the like 10, which will be baited to attract flies. A guard 11 is supported by the uprights 3 concentric with the drum 9. The guard is arranged on one side of the drum with its upper edge slightly below the upper point of the drum, while its lower edge terminates below the drum, being there supported by a transverse strip 12 of solid formation. The guard is also of wire-netting and is supported on the descending or downwardly-traveling side of the drum.

A cage 13 of usual wire-netting is supported by the base 2 of the framework immediately beneath the drum 9. The upper surface 14 of the cage, which may be of netting or solid construction, is formed into a longitudinal aperture 15, arranged centrally beneath the drum, as shown. The guard-supporting strip 12 extends to and in alinement with one edge of the aperture 15. A scraper 16 coextensive in length with the distance between the frame-uprights 3 is supported by said uprights, so that its lower edge is in alinement with the edge of the aperture 15 opposite the strip 12. The scraper is shaped in transverse section about concentric with the drum and terminates at its free or highest edge in an inwardly-projecting lip 17, designed to rest against the surface of the drum or the paper strip thereon. From this construction it will be noted that the drum in its direction of movement traverses a covered way including the guard 11, the supporting-strip 12, and the scraper 16, the only interruption being the aperture 15, leading to the cage 13.

The operation of the fly-trap is as follows: The drum, covered with a suitable bait, is slowly revolved under the influence of the motor and the reducing-gear. The flies alighting on the drum are gradually turned beneath the guard 11, it being understood that the guard is spaced sufficiently from the drum to avoid interfering with this movement. The movement of the drum continues until the flies are scraped therefrom by the scraper-lip 17, when they are brought through the aperture 15 into the cage. The cage may be removed when desired and the flies therein destroyed.

If preferred, the supporting-strip 12 and the scraper 16 may be formed of a single strip of metal, in which is arranged a longitudinally-formed aperture adapted to register with the aperture 15 of the cage.

Having thus described the invention, what is claimed as new is—

A fly-trap comprising a revolving drum, a cage formed with an aperture located beneath the drum, a guard arranged concentric with the drum and a scraper formed with a longitudinal opening in line with the aperture in the cage and having one edge provided with a lip to bear against the drum, said scraper extending beyond the longitudinal opening therein and connected to and supporting the guard.

In testimony whereof I affix my signature in presence of two witnesses.

JAMES G. GIBSON.

Witnesses:
     D. B. HAGERTY,
     F. E. BARNES.